United States Patent [19]
Casper et al.

[11] Patent Number: 5,434,980
[45] Date of Patent: Jul. 18, 1995

[54] APPARATUS FOR COMMUNICATION BETWEEN A DEVICE CONTROL UNIT HAVING A PARALLEL BUS AND A SERIAL CHANNEL HAVING A SERIAL LINK

[75] Inventors: Daniel F. Casper, Poughkeepsie; John R. Flanagan, Staatsburg; Gerald H. Miracle, Pleasant Valley; Richard A. Neuner, Port Ewen; Peter L. Potvin, Ulster Park, all of N.Y.

[73] Assignee: International Business Machines Corporation, Armonk, N.Y.

[21] Appl. No.: 996,370

[22] Filed: Dec. 23, 1992

Related U.S. Application Data

[63] Continuation of Ser. No. 392,754, Aug. 11, 1989, abandoned.

[51] Int. Cl.⁶ .......................................... G06F 13/42
[52] U.S. Cl. .................................. 395/275; 364/239.2; 364/DIG. 1; 395/500; 395/800
[58] Field of Search ............. 395/275, 500, 550, 575, 395/325, 800

[56] References Cited

U.S. PATENT DOCUMENTS

| | | | |
|---|---|---|---|
| 3,688,274 | 8/1972 | Cormier et al. | 395/425 |
| 4,040,037 | 8/1977 | Lawlor | 395/250 |
| 4,272,809 | 6/1981 | Kadowaki | 395/275 |
| 4,453,211 | 6/1984 | Askinazi et al. | 395/500 |
| 4,514,823 | 4/1985 | Mendelson et al. | 395/275 |
| 4,631,666 | 12/1986 | Harris et al. | 395/325 |
| 4,688,221 | 8/1987 | Nakamura et al. | 371/13 |
| 4,712,176 | 12/1987 | Frederick et al. | 395/325 |
| 4,779,189 | 10/1988 | Legvold et al. | 395/425 |
| 4,797,812 | 1/1989 | Kihara | 395/400 |
| 4,809,217 | 2/1989 | Floro et al. | 395/275 |
| 4,841,475 | 6/1989 | Ishizuka | 395/275 |
| 4,866,609 | 9/1989 | Calta et al. | 395/250 |
| 4,882,702 | 11/1989 | Struger et al. | 395/275 |
| 4,908,823 | 3/1990 | Haagens et al. | 370/85.1 |
| 4,939,735 | 7/1990 | Fredericks et al. | 371/47.1 |
| 4,959,833 | 9/1990 | Mercola et al. | 371/32 |
| 5,023,829 | 6/1991 | Shibata | 395/775 |
| 5,068,820 | 11/1991 | Nojima et al. | 395/275 |
| 5,077,656 | 12/1991 | Waldron et al. | 395/325 |
| 5,123,091 | 6/1992 | Newman | 395/200 |

FOREIGN PATENT DOCUMENTS

| | | |
|---|---|---|
| 0021489 | 1/1981 | European Pat. Off. . |
| 0191334 | 8/1986 | European Pat. Off. . |
| 56-157521 | 12/1981 | Japan . |
| 57-111723 | 7/1982 | Japan . |
| 58-195925 | 11/1983 | Japan . |
| 60-103473 | 6/1985 | Japan . |
| 62-92022 | 4/1987 | Japan . |
| 62-212755 | 9/1987 | Japan . |

OTHER PUBLICATIONS

Serial Channel to I/O Interface, Lynch et al., *IBM Technical Disclosure Bulletin*, vol. 19, No. 8, Jan. 1977, pp. 3139-3143.

Primary Examiner—William M. Treat
Attorney, Agent, or Firm—Lawrence D. Cutter; Wayne F. Reinke

[57] ABSTRACT

A device control unit operating under the protocol of a parallel bus is connected by a serial link to a channel that is primarily adapted to operate under a different protocol with device control units connected by a serial link. An extender unit interconnects the parallel bus and the serial link and performs the specific operations of the parallel bus protocol. The channel and the extender unit send serial frames on the link for data transfer and associated operations. These frames are constructed according to a protocol that provides an intermediate step in translating between the protocol of the serial control units and the protocol of the parallel control units. The channel is operable in either mode (by microcode) and the new protocol permits the serial channel mode to be independent of the protocol of the parallel control unit and it permits the two modes to be closely similar in many features. New operations using the protocol reduce the delays that would otherwise be required in the communications between the channel and the extender unit. The serial link can be made longer when the delays are reduced.

3 Claims, 2 Drawing Sheets

APPARATUS FOR COMMUNICATION BETWEEN A DEVICE CONTROL UNIT HAVING A PARALLEL BUS AND A SERIAL CHANNEL HAVING A SERIAL LINK

This application is a continuation, of application Ser. No. 07/392,754, filed Aug. 11, 1989, now abandoned.

CROSS-REFERENCES TO RELATED APPLICATIONS

This invention is related to an application of Miracle, Moyer, Carey and Neuner (Ser. No. 07/392,629, now file-wrapper-continuation 07/981,930) entitled Channel and Extender Unit Operable with Byte Mode or Non-Byte Mode Control Units and an application of Neuner, Miracle, Minassian and Potvin (now U.S. Pat. No. 5,633,078), both filed on the same day as the copending application.

FIELD OF THE INVENTION

This invention relates generally to data processing apparatus and more specifically to apparatus for interconnecting a channel having a serial link with a device control unit having a parallel bus.

A Data Processing System with an I/O Subsystem

A typical large data processing system has a complex of several central processors, a main memory that is shared by these processors, and a number of I/O (input-/output) devices, for example, a terminal from which a person might access a data base in the central processor memory. The I/O devices and the components and data structures that connect them with the central processors are called the I/O subsystem.

In the specific data processing system that will be described later, the path between the device and the processor memory includes, traced from the device to the memory, a device control unit, a channel bus, a channel processor, a data stager which interconnects the many narrow busses of the channels and a single wider bus to main memory, and a main memory controller that handles memory access by the channel data stager and other components such as the central processors. The control unit and channel will be described in detail later. Such a system might have about a hundred channels, each with one bus.

Two systems that our invention is useful with are described in *IBM System/370 Principles of Operation* (GA22-7000) and *IBM System/370 Extended Architecture Principles of Operation* (SA22-7085). For generality, these architectures and architectures that are equivalent from the standpoint of this invention will be called the system architecture.

Some data processing systems have a channel extender which includes a serial link that is connected in the parallel bus between the channel and the control unit to permit control units to be located farther away from the channel. Our invention relates to apparatus of this general type, and these devices will be described later. The term "parallel bus extender" will be used to avoid confusion with other terms which will be introduced later.

I/O Operations

As the path is traced from the device to the processor, the operations of a device become more abstract. From the standpoint of a device control unit, an I/O device performs highly detailed operations that are peculiar to the type of device and peculiar to particular models of a device type.

From the standpoint of the central processors and the operating system, data transfer operations are generalized as a single Start instruction such as Start I/O, Start I/O Fast Release, or Start Subchannel. Other I/O instructions can be executed by a central processor to change the configuration of the I/O subsystem, for example, and are unrelated to this invention.

From the standpoint of the channel, the device and its control unit execute highly abstract commands: read and write and a few related commands and special commands for system configuration and the like. CCW's are created by the operating system and are placed in main memory for execution by a channel. A command is set out in a multi-byte data unit called a Channel Command Word, CCW. A CCW has several fields including a field for a command (such as read or write). It has an address field and a count field that combine to define a block of main memory storage locations where data is to be fetched for transfer to the device or where data from the device is to be stored.

Commonly, a data transfer uses several non-contiguous storage areas in main memory, and the channel program can have a sequence of CCW's that each specify one of these blocks. A single CCW or a group of consecutive CCW's that have the same command but different address fields is called a CCW record. In some of the examples that will be used later, a CCW record for a particular command, such as read, is followed by another record for a different command such as write. Linking successive data transfer CCW's that form a single CCW record is called data chaining and linking one CCW record to another CCW record having a new command is called command chaining. Two bits in the CCW link the CCW's into the list: the chained-data bit (CD) and the chained-command bit (CC).

The channel also accesses other control blocks in main memory. These control blocks hold general information about a device and information about the status of a current I/O operation with the device. These control blocks are also accessed by the operating system.

Conventionally, a parallel bus interconnects a channel and a control unit, and the channel and control unit transfer data and perform other operations on the bus according to a predetermined protocol. The specific embodiment of our invention that will be described later is particularly adapted to operate according to a bus protocol described in publication *IBM System/360 and System/370 I/O interface Channel to Control Unit Original Equipment Manufacturers' Information* (GA22-6974). This publication will be cited as OEMI.

When a channel begins an operation with a device, it performs an operation on the bus called initial selection. The device and the control unit are said to be connected to the channel, and at a later time they disconnect. (The device and control unit remain physically connected in the operations that will be described.) During command chaining, the control unit disconnects at the end of one CCW record and the device is selected again for the next command—an operation called command chaining reselection.

The I/O Device

One familiar I/O device is a reader for punched cards. The card has a fixed data format, for example 80 columns and 12 rows, and the read operation always begins at the first column and ends with the last column. The read operation proceeds slowly, byte by byte, and the card reader ordinarily disconnects from the channel during the delay while the card is mechanically advanced to the next column. Data transfers in which the device is connected to the processor for only a short time are called byte mode operations.

Another familiar I/O device is a direct access storage device (DASD) such as a magnetic disk drive. In data transfers, the disk drive ordinarily remains connected to the channel while data is transferred for an entire CCW count or for an entire CCW record. Typically, like a punched card, the disk has a fixed format and the count of a CCW record corresponds to the length of the disk record. However, the record size is variable and a disk drive can transfer less and may attempt to transfer more than a particular CCW record size. Some disks have gaps between the records, and some channels handle data chaining and command chaining during the time interval for these gaps.

BACKGROUND OF THE INVENTION

A general object of this invention is to provide a new and improved apparatus for interconnecting the parallel bus of a control unit with a bidirectional serial link of a channel. Parallel bus extenders, introduced earlier, provide background information that is useful in understanding our invention. A parallel bus extender is commercially available as the IBM 3044 Channel Extender, and parallel bus extenders have been described in several references.

A publication of Lynch and Thorn in the *IBM Technical Disclosure Bulletin*, Vol. 19 No.8 January, 1977, pages 3139–3143 entitled "Serial Channel to I/O Interface" teaches a bidirectional serial link and components at each end of the link (commonly called boxes) that connect the link to the parallel buses of a channel and a control unit. Information that would otherwise be transmitted entirely over the parallel bus is sent in frames on the serial link. The box connected to the channel appears to the channel as a control unit, and the box connected to the control unit appears to the control unit as a channel. Signals on either parallel bus are formed into serial frames and transmitted to the other box where they are reconverted to the signals on the parallel bus.

U.S. Pat. No. 4,712,176 of Fredericks et al. entitled "Serial Channel Interface with Method and Apparatus for Handling Data Streaming and Data Interlocked Modes of Data Transfer" describes one version of the IBM 3044 channel extender.

U.S. Pat. No. 4,939,735 of Fredericks et al. entitled "Information Handling System Having Serial Channel to Control Unit Link" describes a later version of the IBM 3044 channel extender.

Calta et al. U.S. Pat. No. 4,866,609, entitled "Byte Count Handling In Serial Channel Extender with Buffering for Data Pre-Fetch", teaches a buffer located in the box at the control unit end of the link (called the outboard box). The outboard box receives blocks of data from the channel on a write operation and it handles operations on the parallel bus to the control unit that would otherwise be handled by the channel or would be handled by the outboard box under step-by-step instructions by the channel. Calta et al. also teach that the inboard box can be integrated with the channel and that the channel can be modified to perform byte count operations that are made necessary by the buffer in the outboard box.

Milligan U.S. Pat. No. 4,642,629 also teaches a channel extender with a buffer in the box at the control unit end of the link.

SUMMARY OF THE INVENTION

The references use various names for the components of a parallel bus channel extender. In the following description, apparatus that is connected between the parallel bus of a control unit and the serial link of a channel will be called the extender unit (or extender). Similarly, a channel that cooperates with an extender unit will be called an extender channel. A similar channel or the same channel using different microcode to operate with a direct serial link to a control unit will be called a serial channel.

The extender channel and the extender unit of this invention cooperate to perform conventional operations on the parallel bus of a control unit when the channel executes a conventional channel program. This invention provides a new serial frame protocol for communications between the extender channel and the extender unit that permits the extender channel to be closely similar to a serial channel.

The protocol separates the functions of the extender channel and the extender unit in a way that substantially frees the extender channel of the protocol of the parallel bus. The protocol also frees the serial channel of any requirement to adapt to the protocol of parallel channels and parallel control units.

The new protocol also improves data transfers. As will be explained later in detail, certain operations on the parallel bus must be completed within particular time limits. For example, if a read or write operation can not take place when the addressed part of a disk track moves into the read/write station of the disk drive, the disk must make a full rotation before the operation can begin. Some control units have timers for operations that must be completed within a limited time interval. When the serial link is made several kilometers long, the propagation delay is a significant fraction of these timing intervals. Conversely, the link can be made longer if the extender channel and the extender unit use fewer frames for controlling their operations and/or if the associated delays at the extender unit or at the extender channel can be reduced. The length of the serial link and the number of frames required for controlling the operations is significant because some operations require an initial frame in one direction and a response frame in the opposite direction.

In one specific example, the extender unit performs automatic command chaining reselection in a way that avoids communications that would otherwise be required on the serial link. The invention also provides a slower mode of command chaining reselection in which the extender channel and the extender unit perform operations that correspond approximately to the operations that a parallel channel alone would perform. The extender channel and the extender unit separately check for conditions that would prevent successful automatic command chaining reselection, and the invention provides a method and apparatus for discontinuing automatic command chaining reselection and continuing command chaining by the slower method.

In another specific example, the extender unit sends data frames to the extender channel in a way that simplifies transferring the last byte of a record. After the last byte has been sent to the extender unit, the extender unit sends the channel a last data frame and a status frame. These frames report that the last byte has been received and give other information about the data transfer. The channel times the intervals between data frames from the extender unit and detects the last byte from a pause that is characteristic of a control unit that is preparing to submit ending status. The channel then begins operations for command chaining without waiting for the frame from the extender unit that signals the end of the data transfer.

Other specific features and advantages of the invention will be recognized from the description of the preferred embodiment.

THE DRAWING

THE PREFERRED EMBODIMENT

Figure 1:
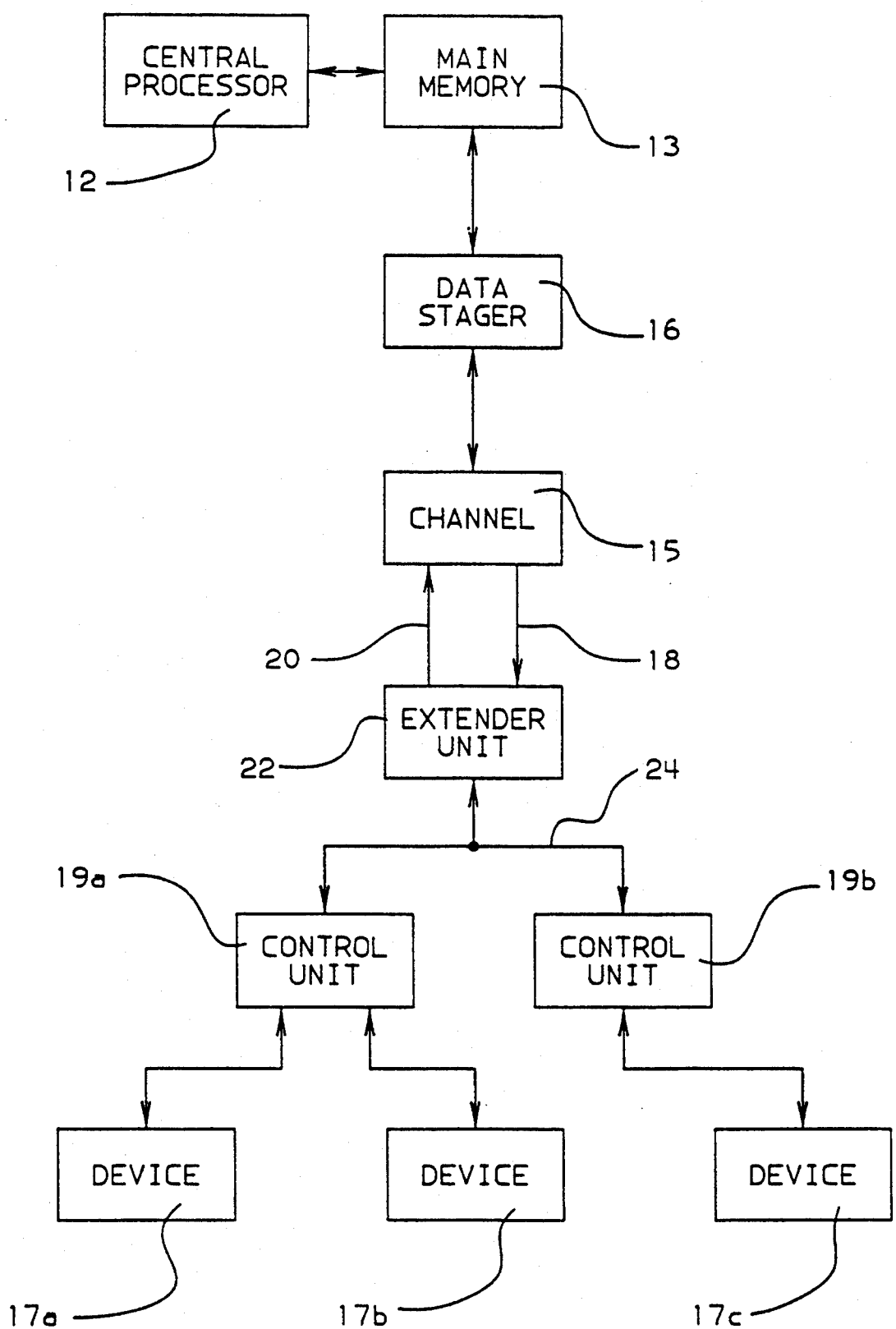
FIG. 1 is a block diagram of a data processing system with the extender channel and the extender unit of this invention.

FIG. 1 shows a representative central processor 12, a main memory 13, a representative channel 15, a data stager 16 that interconnects channel 15 and other channels (not shown) with main memory, representative I/O devices 17a, 17b, 17c, representative control units 19a, 19b connected to the devices, and the extender unit 22 of this invention. The extender unit is connected to the control units by a parallel bus 24 and is connected to the channel by a bidirectional serial link 18, 20. The block 13 for the main memory represents a memory device and a controller that interconnects the memory with the processor 12 and the channel data stager 16. The data stager will be described in more detail later.

The parallel bus 24 of the extender unit is also connectable to a conventional parallel bus extender. A parallel bus extender appears to a channel as a control unit, and it similarly appears to the extender unit as a control unit. Thus, the control units 19a, 19b illustrate the connection of a parallel extender with the extender unit 22.

As is conventional, the channel includes a processor that has hardware and microcode facilities. When the channel operates with an extender unit, microcode routines are loaded for the protocol and operations that will be described later. If the channel is to operate with a serial control unit, microcode routines are loaded for a different protocol and for different operations. The channel communicates with the operating system by executing microcode routines that are substantially the same for either mode.

The preferred channel operates with a single bidirectional serial link 18, 20 and it operates either as a serial channel with serial control units or as a serial extender channel (referred to as a "serial channel" throughout the specification) with a serial extender unit (referred to as an "extender unit" throughout the specification). This is accomplished by physically changing the configuration and loading the appropriate microcode. An object of the invention is to minimize the differences between the two channel operating modes.

Introduction to the Serial Frame Format

A data byte of 8 bits in channel 15 (in either serial mode or extender mode) or in extender unit 22 is transmitted on serial link 18, 20 as a 10 bit character. See U.S. Pat. No. 4,486,739 to Franaszek and Widmer. Frames have a two byte start-of-frame delimiter (K28.5, K28.7 in the terminology of the 8-10 code), a hex 00 byte, one or more frame contents bytes, two error checking bytes, and a three byte end-of-frame delimiter (K28.6, K28.1, K28.1 for a disconnect end of frame or K28.6, K28.4, K28.4 for an abort end of frame). The frame contents characters will be described in detail later. Both the channel and the extender unit transmit idle characters (K28.5) when they are not transmitting frames.

From a more general standpoint, the hex 00 character following the start-of-frame delimiters is an invalid character under the serial protocol. If, through error, an extender frame is received by components operating under the protocol of the serial channel, the frame will be rejected and the error will be reported.

Figure 2:
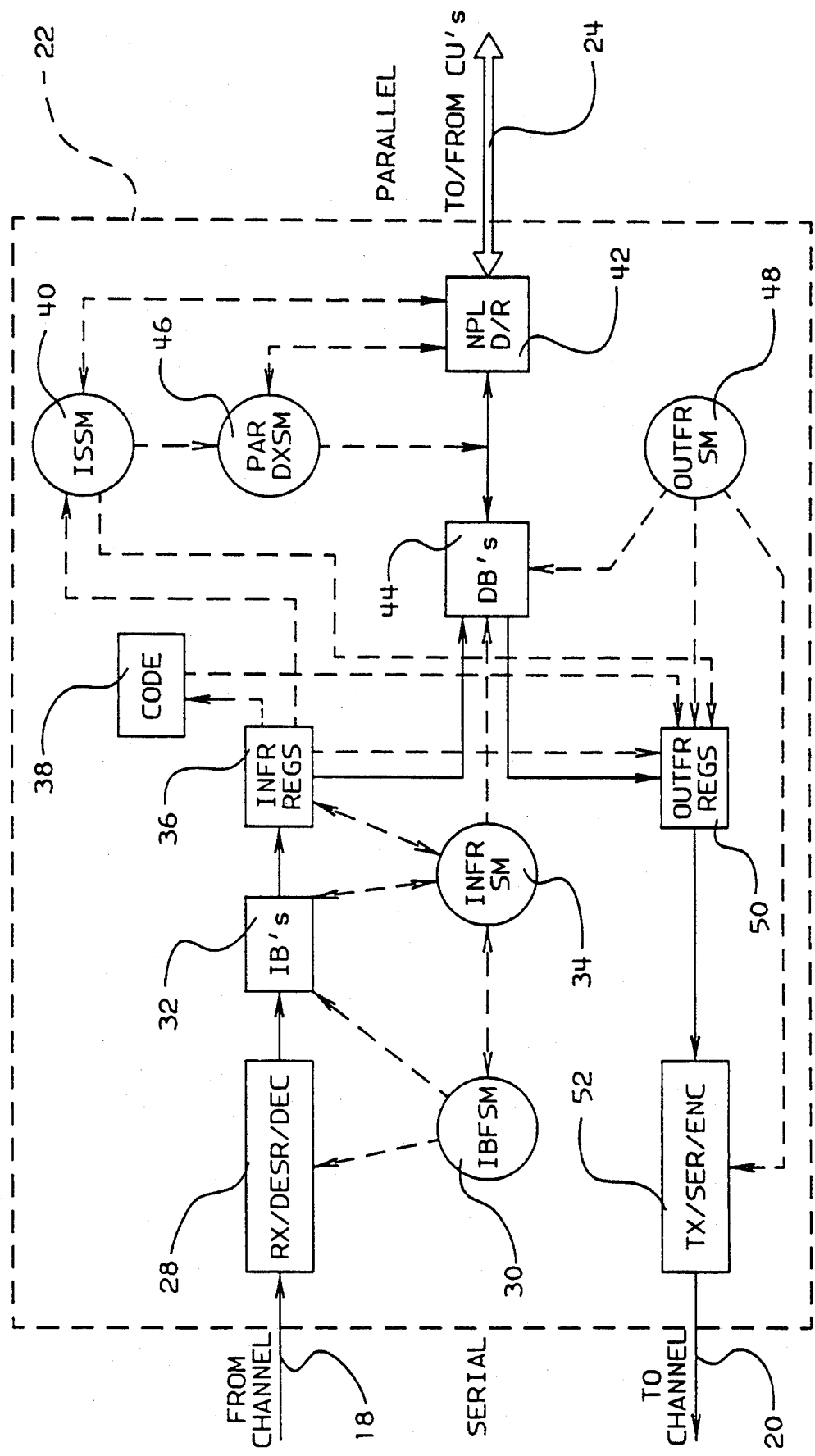
FIG. 2 is a block diagram of our extender unit, the serial link to the extender channel, and the parallel bus to the control unit.

The Extender Unit of FIG. 2—Introduction

FIG. 2 is identical to FIG. 2 of Minassian et al. The two lines of the serial link 18, 20 and the parallel bus 24 will be familiar from FIG. 1. Lines 18, 20 are preferably optical fibers. Circles in FIG. 2 represent state machines and blocks represent buffers and other components. Solid lines between boxes represent the flow of data, and dashed lines show the association of the state machines with these components. A state machine is a sequential logic circuit (as contrasted with a general purpose processor), as is conventional for specialized logic functions that are to be performed at higher speed than would be achieved by a general purpose processor. State machines are commonly described by timing charts, and they will be understood from operations described later.

A frame receiver 28 receives a serial frame on line 18 from the channel, converts bits in the frame from serial to 10-bit parallel, and converts the 10 bit code to an 8 bit byte. The byte also has a parity bit and in parts of the extender unit it has the K bit which is part of the 8-10 code. These components are conventional in parallel channel extenders.

Similarly, a frame sender 52 encodes an 8 bit byte into the 8-10 code, converts the parallel 10 bit code to serial, forms a frame, and transmits the frame to the channel on line 20. Frame sender 52 also forms the CRC bits. While frame sender 52 is not transmitting frames or special continuous sequences, it transmits idle characters.

A parallel bus handler 42 is connected to the parallel bus 24 and has receiver circuits for receiving signals from the control unit and driver circuits for producing signals for the control unit at the appropriate voltage and power. This structure is similar to the corresponding apparatus in parallel channels and parallel channel extenders.

An extender unit data buffer 44 has two separately addressable buffers of 256 bytes each, a byte counter (BC) for each buffer, a write data sent (WDS) counter for each buffer, a Data Request (DR) counter, and a Read Data Request (RDR) counter. The buffer also has conventional store and fetch pointers as described by Calta. Buffer 44 is connected to receive data from the parallel bus handler 42 for a read operation and to supply data to the parallel bus handler for a write operation.

The Read Data Request (RDR) counter holds the number of bytes requested by the channel for a read operation. A new count from the channel is added to this counter, and the counter is decremented by the OUTFRSM state machine when a byte is sent to the channel. Bytes are not sent to the channel when this register count is zero, even if the buffer holds bytes.

A new count from the channel is also added to the Data Request (DR) counter. This counter is decremented when a byte is loaded into the buffer and the count goes negative when the device has transferred more bytes than the current count, as happens during a chained data read operation.

A Buffer Counter tells how many bytes are in a buffer. The Transfer Counter tells how many bytes have been transferred for the current CCW. It is reset to zero after a CDAEND flag has been sent to the channel.

A pair of In-Frame buffers 32 and a set of In-Frame registers 36 form part of the path for frames from frame receiver 28. The two In-Frame buffers are each long enough for the longest incoming frame (preferably 20 characters of 9 bits each, an 8 bit data byte plus a parity bit). The contents of one buffer are read while the other buffer is being loaded. These buffers are described in the application of Minassian et al. Bytes in In-Frame buffers 32 are transferred to predetermined locations of In-Frame registers 36 where they are accessible for particular operations by the state machines.

Out-frame registers 50, form part of the path between the extender unit buffer 44 and frame sender 52 for data to be transmitted to the channel. The state machines that control the flow of data through these components will be explained after the protocol and operations under the protocol have been explained.

The extender also includes a microprocessor for general operations that can be performed slowly, for example transferring the contents of the registers of the extender unit to the channel for diagnostics. Operations of this type are well known and the microprocessor does not require explanation.

The Frame Contents Bytes

In this description the byte positions will be numbered from the first frame contents character, ignoring the two frame delimiter bytes and the hex 00 byte.

Bit positions 6 and 7 in the first byte of the frame contents of each frame identify the operation or frame type and are called the Op field. These two bit positions define three frame types used by both the channel and the extender unit, one type used only by the channel, and one type used only by the extender unit. A Data frame type (Op bits=01), Control frame type (10), and Test frame type (11) are used by both the channel and the extender unit. The channel also forms a Command frame type and the extender unit also forms a Status frame type (both 00). Bit positions 0-5 of the first byte carry Flags or Codes, and this byte will be called the Op/Flags byte or the Op/Codes byte.

The Command Frame Bits 0-5 of the first byte of a Command frame hold flags, as shown in Table 1. The second byte of a Command frame holds the command from a CCW. The third byte of a Command frame holds the device address and the fourth byte holds parameters, shown in Table 2.

TABLE 1

| | the Command frame flags | |
|---|---|---|
| bit | bit name | comment |
| 0 | READ CDA | read with chained data |
| 1 | CC | command chaining |
| 2 | SILI | suppress incorrect length indication |
| 3 | CMD UPDATE | command on data reconnection |
| 4 | CDA END | end of a chained-data CCW |
| 5 | END | end of CCW record |

TABLE 2

| | Command frame parameters | |
|---|---|---|
| bit | bit name | comment |
| 0 | DS | data streaming mode |
| 1 | 4.5 | 4.5 mb/sec architecture |
| 2 | SELECTOR MODE | |
| 3 | BYTE MODE | |
| 4 | SUPPRESS DATA | suppress data less than N bytes |
| 5 | TIME DX | time for data transfer inactivity |
| 6-7 | | not used |

All of the command flags are discussed later in the examples of automatic command chaining reselection.

On the parallel bus, the tag Suppress Out tells the control unit to wait before sending any more bytes on a read operation. A command frame with the Suppress Data flag set=1 can be used when an extender unit is executing a data transfer with a control unit that is connected through a parallel bus extender. The parallel bus extender link acts as a buffer and during a read operation it carries bytes that must be loaded into the extender unit buffer. The extender unit raises Suppress Out on the parallel bus when the number of bytes in the extender unit buffer reaches the highest value (preferably 128) that would permit the extender unit buffer to continue to receive the maximum number of bytes propogating on the parallel bus and the parallel bus extender link without overflowing. If this bit is set=0, the extender unit raises Suppress Out only when a smaller number of bytes (preferably 16) would overflow the extender unit buffer. The channel sets this bit from conventionally available configuration data for the I/O subsystem.

Time DX turns on or off a timer that signals a fault if the extender unit does not receive data during a predetermined interval. The other parameters will be understood readily from the system architecture and the OEMI publication. The first parameter bit (DS) and second parameter bit (4.5) sets the data rate for data transfers in data streaming mode. A control unit can disconnect between primary status and secondary status if the Selector Mode bit is set to 0 and cannot disconnect if the bit is set to 1. Byte Mode identifies a device such as a card punch that may disconnect from the extender unit at any time.

The Data Frames On a read operation, an inbound frame which will be called a Read Data frame carries the Op/Flags byte and a suitable number of read data bytes for transfer from the channel to main memory (preferably 0 to 16 bytes per frame). Table 4 shows the flag bit assignment for inbound data frames. An outbound frame, called a Read Data Request frame, carries three bytes: the Op/Flags byte and a count field of two bytes. Table 3 shows the flag bit assignment for outbound data frames.

On a write operation, an outbound frame, called a Write Data frame, carries the Op/Flags byte and a suitable number of write data bytes for transfer from the extender unit to the control unit (preferably 0 to 16 bytes per frame). The flags for outbound write frames are the same as outbound read flags and are shown in Table 3. An inbound frame, called a Write Data Sent frame, carries the Op/Flags byte and a count field of one byte which indicates the number of write data bytes that have been sent to the control unit from the extender unit either since the command frame was received or since the last Write Data Sent frame was transmitted to the channel (preferably a count of 0 to 32 per frame). The flags for inbound write frames are the same as the inbound read flags and are shown in Table 4.

TABLE 3

Outbound Data Frame flags

| bit | bit name | comment |
|---|---|---|
| 0 | | not used |
| 1 | CC | command chaining |
| 2 | SILI | suppress incorrect length indication |
| 3 | READ DATA REQ | data read request |
| 4 | CDAEND | end of a chained-data CCW |
| 5 | END | end of CCW record |

TABLE 4

Inbound Data Frame Flags

| bit | bit name | comment |
|---|---|---|
| 0-2 | | not used |
| 3 | WR DATA SENT | write data sent frame |
| 4 | CDAEND | end of CD CCW reached |
| 5 | END | end of CCW record reached |

The END and CDAEND flags The END flag tells the extender unit that the current count is the end of the CCW record. The CDAEND flag tells the extender unit that the current count ends a data-chained CCW. Read Data Request frames that do not exhaust the count of the current CCW have both END and CDAEND flags reset to 0. The extender unit retains the END flag or the CDAEND flag (whichever is in the Read Data Request frame) during the data transfer. The END flag will be returned by the extender unit to the channel in an inbound data-type frame if the control unit transfers data to the last byte of the CCW record. The CDAEND flag will be returned similarly in an inbound data-type frame if the control unit transfers data to the last byte of the current CCW. The extender unit performs operations that will be described later in response to these two flags.

The Control Frame An outbound Control frame has three bytes and an inbound Control frame has six bytes. In both Control frames, bit positions 0-4 carry a five bit code. Table 5 shows the codes for an outbound Control frame and Table 7 shows the codes for an inbound Control frame. Not all 32 combinations are used. Bit 5 is not used and is set to 0 in every Control frame. The codes end in hex 2 or hex A because the last three bits are 010. The second byte carries flags shown in Table 6 for an outbound control frame and Table 8 for an inbound control frame. The third byte contains the device address for all Control frames except Validate Byte Count (code hex 42 in Table 5) which contains the expected Buffer Count from the channel. In an inbound Control frame, the fourth and fifth bytes hold a count called the Transfer Count and the sixth byte holds a count called the Buffer Count.

TABLE 5

Outbound Control Frame Codes

| hex code | meaning |
|---|---|
| 02 | Disable polling |
| 0A | Enable polling |
| 22 | Accept Status, |
| 2A | Accept Status/Indicate CC |
| 32 | Stack Status |
| 42 | Validate Byte Count |
| 52 | Retry Last Frame |

TABLE 5-continued

Outbound Control Frame Codes

| hex code | meaning |
|---|---|
| 62 | Reset Suppress Out |
| 6A | Interface Disconnect |
| 72 | Selective Reset |
| 7A | System Reset. |

TABLE 6

Outbound Control Frame Flags

| bit | bit name | comment |
|---|---|---|
| 0 | INH INIT SEL | inhibit partial initial selection |
| 1 | INIT CC RESEL | initiate CC reselection |
| 2-7 | | not used |

Some of these codes will be described later when they appear in examples of the operation of the extender unit and the extender channel. Others will be readily understood from the comments in the tables or from their direct relation to the protocol of the parallel bus.

TABLE 7

Inbound Control Frame Codes

| Hex code | Meaning |
|---|---|
| 82 | Response/Executed |
| 8A | Control Unit Connected |
| 92 | Control Unit Disconnected |
| 9A | Data Reconnect |
| EA | Successful IFD |
| F2 | Successful Selective Reset |
| FA | Successful System Reset |

Codes 82-92 are explained in the examples. Code 9A is described in a related application. The other codes correspond to the protocol of the parallel bus.

TABLE 8

Inbound Control Frame Flags

| bit | bit name | comment |
|---|---|---|
| 0 | POLLING ENABLED | Request In will be polled |
| 1 | STOP GIVEN | Cmd Out issued on data transfer |
| 2 | DS FREEZE | extender unit overrun during data streaming |
| 3-4 | | not used |
| 5-6 | CV COUNTER | counter for link character errors |
| 7 | CHAINING CHECK | as defined by system architecture |

The status frame This frame has six bytes. The first byte has the flags shown in Table 9.

TABLE 9

Status Byte 1

| bit | bit name | comment |
|---|---|---|
| 0 | SELECT IN | initial selection tag |
| 1 | CC IN PROG | command chaining |
| 2 | SHORT BUSY SEQ | OEMI routine |
| 3 | INITIAL STATUS | initial device status |
| 4 | EXTENDER STATUS ONLY | extender status in third byte |
| 5 | | not used |

The second byte carries device status from Bus In. The third byte carries the status of the extender unit, as shown in Table 10.

TABLE 10

| bit | bit name | comment |
|---|---|---|
| | Extender Status | |
| 0 | MK 0-IN | MARK 0-In active when Status In rose |
| 1 | STOP GIVEN | see Table 8. |
| 2 | DS FREEZE | see Table 8. |
| 3 | LF/NOS | fault on link |
| 4 | FAN STOPPED | extender unit fault |
| 5 | PCC | other extender unit check |
| 6 | ICC | interface control check |
| 7 | CHAINING CHECK | |

Bits 0, 6 and 7 are from the parallel bus protocol or the system architecture. Bits 1 and 2 correspond to flags in an outbound Control frame and provide an indication to the channel that the extender unit has transferred all the data and that Command Out was raised to stop the control unit. Bit 3 signals loss of light on the incoming fiber or a special sequence called not operational sequence which reports an error by the component sending the sequence. Bits 4, 5 and 6 are faults detected by the extender unit.

The fourth and fifth bytes, the Transfer Count, are the contents of a counter in the extender unit, called the Transfer Counter, which indicates the total number of data bytes transferred between the channel and control unit for the current CCW. The Transfer Count is used by the channel for serial data transfer validation. The sixth byte, the Buffer Count, is the contents of a Buffer Counter, also used for serial data transfer validation, which will be described later.

The Test Frame These frames allow the channel to set the configuration of the extender unit (for example to set a time-out parameter in the extender unit), to read registers of the extender unit for fault analysis, and to sense and control the parallel bus directly for diagnostics or error analysis.

Command Chaining Reselection

The program of table 11 is conventional from the system architecture. The commands for each CCW are repeated for clarity but these fields for CCW's 2 and 3 are set to hex 00. The symbolic addresses DA1..DA4 represent multi-bit address in main processor memory. The byte counts are arbitrary except that they do not show a 0 byte count in this example.

TABLE 11

A Sample Channel Program

| CCW number | Command | Data Address | Chaining Bits | Byte Count |
|---|---|---|---|---|
| 1 | Read | DA1 | CD | 16 |
| 2 | Read | DA2 | CD | 4 |
| 3 | Read | DA3 | CC | 11 |
| | (end of CCW record) | | | |
| 4 | Write | DA4 | 00 | 21 |
| | (end of CCW record and channel program) | | | |

The Chained Data Read Operation In the following example the chained data read operation proceeds without special conditions that require additional frames.

1. The channel sends the extender unit a Command frame with the Read CDA flag set=1 signifying that read data chaining is in effect. The CDAEND flag is set=0 signifying that this count does not exhaust the current CDA CCW. The END flag is set=0 signifying that the current CCW is not the end of the CCW record.

2. The extender unit then puts the device address on Bus-Out, and raises Address Out, Hold Out, and Select Out. (The device address is from the third byte of the Command frame.) (In a parallel channel, Hold Out and Select Out are raised and dropped together, and they are electrically tied together in the parallel bus handler 42.) The control unit for the addressed device raises Operational In. The extender unit then drops Address out and the initial selection process continues.

Initial status tells whether the device can perform the operation. In this example status signifies that the operation can proceed. These operations by the extender unit are the operations that would otherwise be performed by a channel on a parallel bus, and the extender unit now sends a Status frame to the channel with the status byte from Bus In residing in byte position 2. The channel performs the conventional operations on device status and then sends the extender unit a Read Data Request frame with the Read Data Request bit set, CDAEND set and 16 in the byte count field—the count in CCW1.

3. The extender unit and the control unit now complete the conventional initial selection: the extender unit raises Service Out to signal the control unit that the channel has accepted status, the control unit drops Status In and then the extender unit drops Service Out. The control unit then puts a data byte on Bus In and raises Service In or Data In to begin the transfer. The extender unit transfers these data bytes to the channel, as will be explained later.

The chain of CCW's defines different storage blocks in processor memory, and the data transfer at the control unit is independent of data chaining. The control unit places the next byte on Bus In and raises Service In or Data In (transfers are initiated by the control unit). The extender unit accepts the byte since presumably the next CCW will have a high enough byte count to handle it.

The channel fetches the next CCW, CCW2, and sends the extender unit the second Read Data request frame. The frame has a count of 4 (in the second and third bytes), corresponding to the byte count in CCW2. The CDAEND bit is set=1 because this count exhausts CCW2.

The channel fetches the next CCW, CCW3, which contains a count of 11, the CD flag=0 and the CC flag=1, and sends the extender unit the third Read Data request frame containing a count of 11, the CC flag=1 and the END flag=1.

Ending the Chained Data Read Operation The operation with CCW3 begins as already explained except that the CC bit is set to 1 and the CD bit is reset to 0. After the control unit has transferred the last byte (byte 31) and the extender unit has dropped the data out tag to signify that the last byte has been accepted, the control unit may have reached the end of its own data format (like the last column of a punched card) and it raises the tag Status In instead of a Data In tag.

Since the command chaining bit is set, the channel fetches the next CCW and the extender unit and the channel cooperate to perform a command chaining operation, as will be described next.

Command chaining reselection by a parallel channel As an introduction to the operations of the channel and the extender unit on the serial link, it will be helpful to review how a parallel channel performs command chaining reselection.

1. The control unit presents primary status after the last byte has been transferred. The channel raises Suppress Out and Service Out and the control unit responds by dropping the tag Status In and Operational In, thereby disconnecting from the bus. The device is reselected as already described.

2. The channel fetches the next CCW and presents the command to the control unit on Bus Out. The control unit presents device initial status on Bus In and raises the tag Status In.

3. The channel checks initial status and if the status is satisfactory and other conditions are met, the channel raises the tag Service Out and the control unit drops the tag Status In.

4. In response to the fall of Service Out, the control unit raises the tag Service In or Data In and in a read operation puts the first byte on Bus In. (Service In begins a data transfer in interlocked mode and Data In begins an operation in data streaming mode.) The channel then raises the corresponding tag Service Out or Data Out and in a write operation puts the first byte on Bus Out.

Automatic Command Chaining Reselection

Time Limits on Command Chaining Reselection For operations by the channel that are performed in the gap between records, the device has a short time out (about 30 microseconds) during which it must receive the rise of Command Out. If the chained command is a write command, the device must receive the first byte within about 30 microseconds after the rise of Command Out. A write operation will be described since it illustrates both of these timing requirements.

On the serial link, the extender channel and the extender unit cooperate to perform the same overall operation as the parallel channel. From the standpoints of both the operating system and the control unit, the operation is kept the same as before.

The numbered paragraphs below show the sequence of operations as the extender unit executes automatic command chaining reselection in response to the command chaining bit in the last Read Data Request frame from the channel (for CCW3). Note that the operations by the control unit are conventional.

1. The control unit presents ending status by putting a device status byte on Bus In and raising the tag Status In. With the rise of Status In, the timers in the control unit start running for the rise of Command Out and the first byte of a subsequent write operation.

2. The extender unit examines the device status byte for the following condition: the Device End bit and the Channel End bit must both be set to 1, the Status Modifier bit can be either a 0 or a 1, and all other bits must be set to 0. In this example, the device status byte meets these tests.

The extender unit sends the device ending status byte to the channel in a Status frame with the CCINPROG flag set=1; it signals command chaining to the control unit by raising Suppress Out; and it raises Service Out to accept device status. The control unit may then disconnect from the extender unit in the way defined by the system architecture and the OEMI publication.

If the Selector Mode bit is set=0 in the parameters of the current Command frame, the extender unit allows the control unit to disconnect between split Channel End and Device End during command chaining by dropping Hold Out and Select Out when raising Service Out to accept primary ending status. When the Selector Mode bit is set=1, the extender unit raises Service Out without dropping Hold Out and Select Out, thus forcing the control unit to keep Operational In up and thereby remain logically connected between primary status and secondary status.

(As part of the protocol for the parallel bus, the device status byte has a bit for channel end and a bit for device end. Channel end means that the channel is free to do some unrelated operation and device end means that the device is ready to begin another operation. In some situations, channel end occurs without device end, and the control unit later reconnects to present status with device end. The later status byte with device end is called secondary status. The first status byte, with channel end and with or without device end, is called primary status.)

If primary status byte does not meet this test, the extender unit and the channel may be able to continue a normal chained write operation, and the extender unit sends the status byte to the channel in a Status frame with the CCINPROG flag set=0 and the extender unit does not raise Service Out. The channel examines the status byte and selects an appropriate action to recover from an error or to continue normal operation. The channel sends the extender unit a Control frame with a code for accept status, accept status and indicate command chaining, or stack status. The extender unit raises Service Out to accept status or Command Out to stack status. For example, if the status byte did not contain Device End, the device will later present secondary status (with the Device End bit set=1). These operations by the channel and the subsequent operations by the extender unit are conventional in a parallel channel and do not require specific discussion.

3. The control unit drops Status In and Operational In and the extender unit drops Service Out. The device is now disconnected from the channel. This is the normal protocol for disconnecting a device from the channel. Note that the extender unit does not send the usual CU Disconnected Control frame to the channel—device disconnection proceeds automatically if the status byte meets the test.

4. The extender unit puts the device address on Bus Out, raises Address Out, Hold Out and Select Out. The control unit raises Operational In. The extender unit drops Suppress Out and Address Out and the control unit raises Address In and puts its address on Bus In.

The operation at the extender unit cannot go farther until the channel has completed steps 5 and 6 below and the extender unit has received the new command. In some situations the channel will complete steps 5 and 6 before the extender unit completes step 4.

5. When the channel gets the frame for ending status, it performs conventional operations in response to device ending status and makes other tests to decide whether the operation can proceed. (The test by the extender unit is not sufficient by itself; for example, the channel fetches the next CCW and tests it for validity.)

6. If the operation is to proceed, the channel sends the extender unit a Command frame with the write command from CCW4 in the second byte and with all bits in the Op/Flags byte set to 0.

7. The extender unit puts the write command on Bus Out and raises the tag Command Out (or the extender unit and the control unit continue their operations through paragraph 4 above and the extender unit then puts the command on the bus).

8. For the write command of this example, the channel immediately sends the extender unit a Data frame with 16 bytes (the maximum in the preferred frame format, fewer if the byte count is less than 16). The END and CDAEND flags are set to 0 in this Data frame because the CCW count is 21 and another Write Data frame will be sent with the remaining bytes.

The control unit now stops its timer for the rise of Command Out. The time for the operation so far has included one link turn-around: the Status frame from the extender unit and the Command frame from the channel. The automatic reselection has avoided the delay that would otherwise have been required for the channel to send the Control frame for Accept Status-/Indicate CC (code hex 2A) and the flag bit set for INIT CC RESEL.

9. In response to Command Out, the control unit drops Address In and the extender unit then drops Command Out.

10. The device presents initial status by and putting its status byte on Bus In and raising Status In.

11. The extender unit checks initial status for all 0 bits, sets Service Out to accept the initial status, and sends the initial status to the channel. The extender unit raises Suppress Out, which is an early indication of Suppress Data to the control unit. The channel checks the status and continues the operation if the status byte is hex 00.

12. The channel sends the extender unit a Write Data frame with the remaining 5 bytes of the CCW count. In this frame, the END flag is set=1 to signal the end of the CCW record and the CD and CC bits are each set to 0 to show the end of the channel program. Preferably the extender unit buffer is loaded independently of the other operations of the extender unit, and the second Data frame can be sent at any appropriate time.

In response to Service Out, the control unit drops Status In. The extender unit then drops Service Out and Suppress Out.

13. The extender unit transfers 21 bytes to the control unit under the normal data tag protocol.

14. The extender unit sends a Write Data Sent frame to the channel with a byte count of 21 and the END flag set.

15. When the control unit raises Service In or Data In after the last byte of the CCW record (byte 21), the extender unit raises Command Out, the control unit drops Service In or Data In, the extender unit drops Command Out, and the control unit raises primary ending status in.

16. the extender unit sends the channel a Status frame with primary device ending status. The channel sends the extender unit a Control frame with the code for Accept Status, and the extender unit accepts ending status by raising Service Out and dropping Hold Out and Select Out. The fall of Hold Out and Select Out allows the control unit to disconnect.

17. The control unit disconnects by dropping Operational In and the extender unit drops Service Out.

18. The extender unit sends the channel a Control frame with the code for control unit disconnected.

Stopping Automatic Command Chaining Reselection

If the extender unit detects that the automatic reselection cannot continue (as already explained) or if the channel finds a condition that prevents continuing (as in the examples), the channel executes a conventional selective reset operation by sending the extender unit a Control frame with the Op/Codes byte to indicate Selective Reset (hex 72) and bit 0 of the flags byte set to a 1 (Inhibit Initial selection).

The State Machines of FIG. 2

During a write operation, the In-Buffer Fill state machine IBFSM 30 detects that a frame is being received by the frame receiver 28, checks the CRC bytes for validity, and stores the frame into one of the two In-Frame Buffers 32. When IBFSM has stored a frame in one In-Frame buffer 32, it toggles its in-pointer to select the other In-Frame buffer for the next frame.

When INFRSM state machine 34 detects that a frame is being stored in one of the two In-Buffers, it moves parts of the frame into predetermined positions in In-Frame registers 36 and decodes the frame type. If the frame is a Command frame, state machine INFRSM sets INSERDX mode (incoming data transfer mode) and signals the Initial Selection state machine ISSM 40. The mode of the operation is one of several states that control the collection of state machines.

The ISSM state machine accesses the In-Frame registers for information in the command frame to perform an initial selection sequence to the addressed control unit (through interface handler 42). If initial selection proceeds successfully and the control unit puts initial status on Bus In, the ISSM state machine stores the initial status byte in Out-Frame registers 50 and signals the OUTFRSM state machine 48. The OUTFRSM state machine then controls the frame sender to send the channel a status frame with the Initial Status flag set=1. (See Table 9.)

While the OUTFRSM state machine is sending the status frame to the channel, the ISSM state machine continues the initial selection sequence. When the extender unit is in INSERDX mode (set by the INFRSM state machine as explained earlier), a read operation can begin as soon as the extender unit receives a Read Data Request frame with either the END flag or a nonzero count. A write operation can begin when either the END flag or at least one byte of write data has been received in a Write Data frame and stored in extender unit buffer 44.

On a write operation, the INFRSM state machine receives Write Data frames, stores the write data bytes in the selected data buffer of the extender unit buffer 44, and increments the corresponding buffer counter for each byte stored. On a read operation, the INFRSM state machine adds the data request count from a Read Data Request frame to both the Data Request counter and the Read Data Request counter. When the Data Request counter is non-zero, the PARDXSM state machine controls the parallel bus handler to accept read data from the control unit and increments the selected Buffer Counter. In response to the non-zero state of the Read Data Request counter and the non-zero state of the selected Buffer Counter, the extender unit sends Read Data frames to the channel.

Transferring Data to Main Memory

In the data stager, buffer memories or registers match several narrower bus width on the channel side of the buffer to a wider bus width on the main memory side. On a read operation, the buffer handling components of the channel and the data stager automatically transfer data from a buffer when the buffer has accumulated enough bytes to fill the next bus in the sequence. The width of these buses is ordinarily an integer power of two (1, 2, 4, . . . bytes wide). A record length can be a multiple of these bus widths ( . . . , 128, 256, . . . bytes long), and in this situation the last byte transferred from the extender unit to the channel is automatically transferred through the buffer chain and stored in main memory.

The channel detects the normal end of the CCW record from its byte count. If some of the buffers in the sequence are only partly full, these bytes are transmitted through the buffer sequence and stored in main memory.

Early End In the operations that have been described so far, the device record length has equaled the CCW record count and the data transfer has ended after a full record has been transferred. In some situations, the program that creates the CCW's for a channel program does not know the actual number of bytes in the record, and the byte count in the CCW is made large enough to permit a full record to be read. When the device comes to the end of its record it raises the tag Status In instead of Service In or Data In and it puts primary status on Bus In. For operations that may end in this way, a bit in the CCW called Suppress Incorrect Length Indication (SILI) is set=1, and the channel does not report an incorrect length condition. If the command chaining bit is set=1, the channel will continue to the next CCW.

Early End with Partially Filled Buffers A normal early end may occur while the buffers in the channel and the data stager are partly full. Before the channel can proceed with the command chaining operation, the last byte must be advanced through the buffers and stored in main memory. (It is not sufficient for the channel to transfer the last byte to the data stager.) In the worst case, each buffer has one fewer byte than the number to produce an automatic transfer to the next bus of the data stager. The time required for this transfer is significant in relation to the time available for command chaining. Conversely, the link can be made significantly longer if this delay can be avoided while the timers are running in the control unit.

Data Blocking in Read Data Frames When each frame contains a large block of data bytes, the serial data transfer is more efficient because fewer frame headers and delimiters are required. However, accumulating bytes in the buffer memory of the extender unit for these frames presents the problem of sending partial blocks on early end.

Preferably, the extender unit does not accumulate bytes for a block transfer during a read operation that is to be followed by command chaining. Instead, the extender unit sends bytes to the channel as they are received from the control unit. For slower devices, a frame has only one byte. When early end occurs, the extender normally has no data to send to the channel.

The OUTFRSM state machine 48 in the extender unit signals when the Read Data Request Counter is greater than 0 and the Buffer Counter is greater than 0. When both of these conditions exist, OUTFRSM state machine 48 forms a frame, adding bytes until one of the counts or both counts become 0. As already explained, the frame sender 52 sends idle characters to the channel when it is not sending frames. Some frames will be longer because the buffer in the extender unit fills while the channel is sending the next Read Data Request frame, and these frames are sent with no more than a maximum number of bytes, preferably 16 bytes.

The extender unit can accumulate blocks of bytes in its buffer to form long frames for read operations that do not have command chaining. As a simplification, all read data is sent to the channel in short frames. Note that the serial link between the extender unit and the extender channel is not shared with other components, that the channel operates only with one extender unit (or only with one extender unit at a time if several extender units are part of a partition in a switch), and that the link carries idle characters when it is not carrying frames.

Detecting Early End at the Channel The operations of the parallel control unit between the last byte of a read operation and primary status typically require a short delay (6–10 microseconds). The channel detects this delay and transfers all of the bytes in the buffers to main memory. Without this operation, the channel would begin the store operation when it received the Status frame from the extender unit.

The channel is given a 1 byte counter called the Idle counter and two latches called the Enable Early End Detect latch and the Arm Early End latch. The Enable Early End Detect latch is set when this operation is to take place and is reset when the operation is not to take place, for example it is set when a data transfer is with a DASD device. (Main memory holds a control block for each device that holds this information and other information that the channel uses in I/O operations with a particular device.)

The latch Arm Early End is set when a Read Data frame is received with more than one data byte. The latch thus identifies devices having a data rate that is high enough that requires the operations for command chaining to be performed in a limited time. For devices with a high data rate, each Read Data frame holds a few bytes (3 or 4 bytes for example). The Arm Early End latch provides an additional test for a device that has critical timing requirements during command chaining.

The Idle counter is reset to hex 00 when any non-idle character is received. (Recall that the line always carries frames, idle characters, or other special sequence characters and that idle characters do not occur within a frame.) The channel increments the Idle counter for each idle character. Thus, the counter tells the number of idle characters following a frame. While the control unit is sending bytes to the extender unit from a device with a high data rate, the channel receives multi-byte Read Data frames with only a limited number of idle characters between frames. If the number of idle characters exceeds this limit, the inference is that the delay is caused by operations in the control unit associated with ending status and that the channel has received the last byte of the device record.

The channel includes hardware and microcode facilities to test the Enable Early End Detect latch, the Arm Early End latch, and the Idle counter. In response to the set state of these latches and a count greater than a predetermined value, the channel performs these operations: (1) it transfers any data in the data stager to main memory, (2) it moves any last bytes to the data stager and (3) it then stores these bytes in main memory.

In the preferred channel, the Idle counter is tested for a count greater than hex 30 which corresponds to an interval of about 2.4 microseconds, giving the channel a 3.6 to 7.6 microsecond jump on transferring data to main memory. This savings in time permits the serial link to be made about 0.3 kilometers longer.

Handling Back-to-Back Short Frames in the Channel The channel is provided with efficient hardware for handling short frames. During a data transfer, a hardware check is made on the Op/Flags byte of an incoming frame (see Table 4) and if a frame contains only data, the data bytes are stored in the channel buffer without invoking the microcode routines. If the Op/Flags byte has END or CDAEND bits set, the microcode routines are invoked.

SUMMARY

From this description of a preferred embodiment, those skilled in the art will recognize variations to adapt the invention to various systems within the spirit of the invention and the scope of the claims.

Having described our invention, what we claim as new and desire to secure by Letters Patent is:

1. In an I/O subsystem of a data processing system having a memory storing a channel program, a parallel control unit operable according to the protocol of a parallel bus, a serial extender channel having access to the memory and which is operable with a serial link and operable to form Command frames and Data frames defining operations on the parallel bus in the execution of said channel program having one or more CCW's, a CCW record being designated as a data transfer either specified by a single CCW containing a command but without chained data or specified by a group of consecutive chained data CCWs with the same command but different address fields, and a chained data CCW being designated a CDA CCW, a serial extender unit coupled to the serial extender channel through the serial link, comprising:

means for connecting the serial extender unit to operate with the parallel control unit on a bus according to the parallel bus protocol;

means for connecting the serial extender unit to send frames to the serial extender channel and to receive frames from the serial extender channel on the serial link;

means for recognizing in a frame for a data transfer a flag defining the end of a CDA CCW (CDAEND) and a flag defining the end of a CCW record (END); and means responsive to said flags for performing operations associated with the end of a CDA CCW and the end of a CCW record.

2. The serial extender unit of claim 1 wherein the serial extender unit comprises:

means responsive to a frame from the channel containing a flag defining the end of a CDA CCW (CDAEND) for returning a corresponding flag (CDAEND) to the serial extender channel when the data transfer for the frame has been completed; and means responsive to a frame from the serial extender channel containing a flag defining the end of a CCW record (END) for returning a corresponding flag (END) to the serial extender channel when the data transfer for the frame has been completed.

3. The serial extender unit of claim 2 wherein one operation of the serial extender unit associated with the end of a CCW record is command chaining for executing a following CCW record.

* * * * *